Nov. 5, 1968 W. C. HOEIJENBOS 3,408,724
BEARING PULLER FOR REMOVING BEARINGS FROM VEHICLE AXLES
Filed Aug. 26, 1966 2 Sheets-Sheet 1
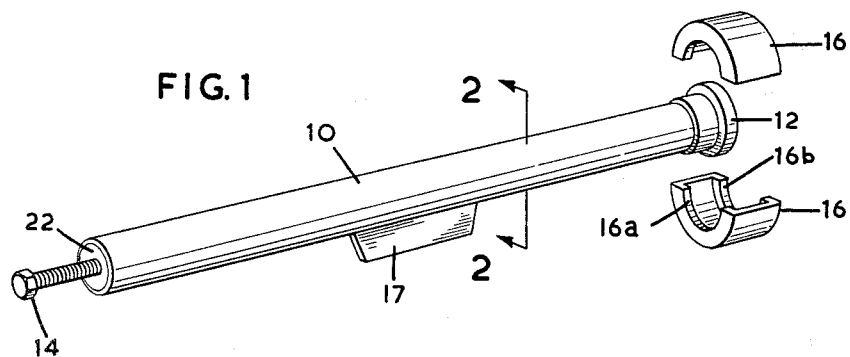
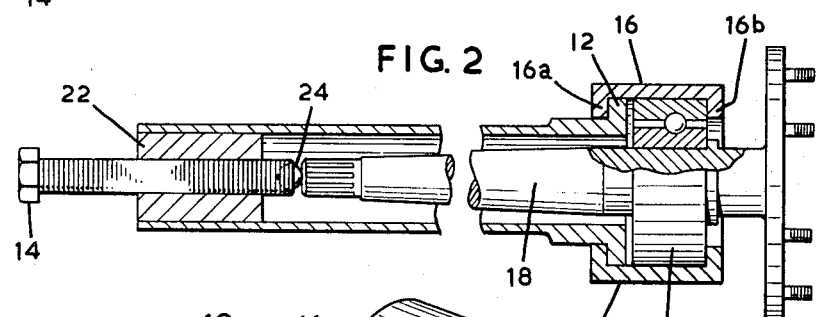
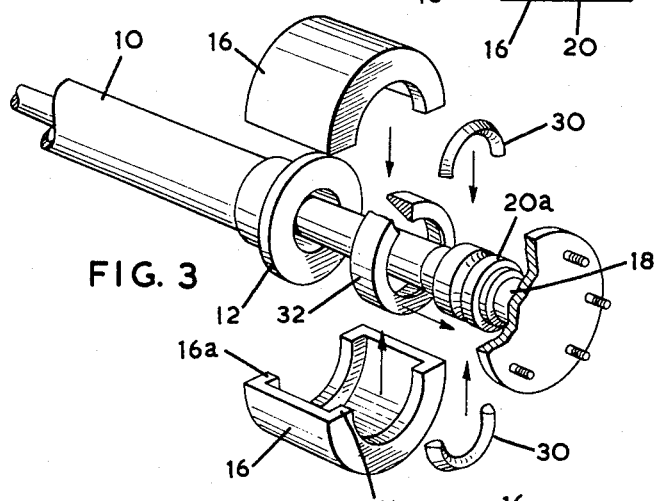
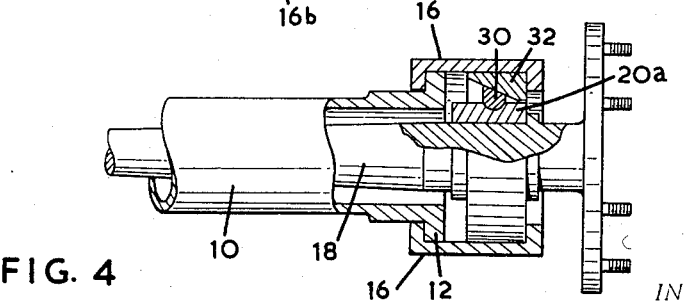
INVENTOR.
WILLIAM C. HOEIJENBOS
BY *Fetherstonhaugh & Co.*
ATTORNEYS Nov. 5, 1968   W. C. HOEIJENBOS   3,408,724
BEARING PULLER FOR REMOVING BEARINGS FROM VEHICLE AXLES
Filed Aug. 26, 1966   2 Sheets-Sheet 2
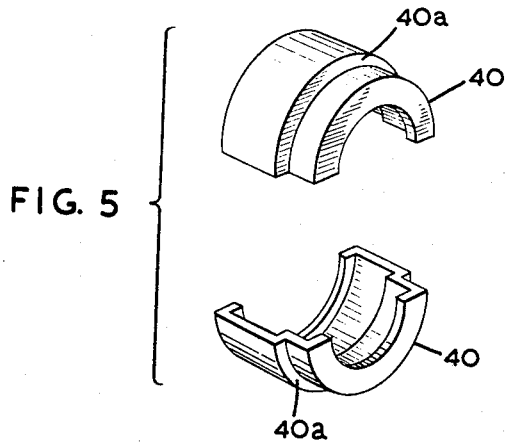
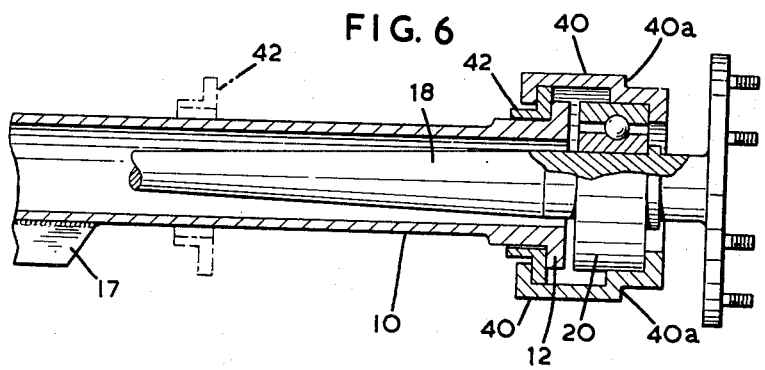
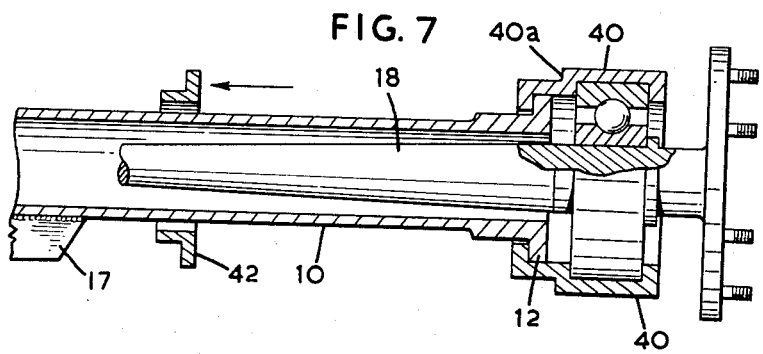
INVENTOR.
WILLIAM C. HOEIJENBOS
BY Featherstonhaugh & Co
ATTORNEYS United States Patent Office 3,408,724
Patented Nov. 5, 1968

3,408,724
BEARING PULLER FOR REMOVING BEARINGS FROM VEHICLE AXLES
William C. Hoeijenbos, 194 Gary Drive,
Weston, Ontario, Canada
Filed Aug. 26, 1966, Ser. No. 575,402
Claims priority, application Canada, Oct. 21, 1965,
943,424
1 Claim. (Cl. 29—263)

ABSTRACT OF THE DISCLOSURE

The bearing puller of this invention essentially consists of a tube for receiving an axle or the like from which a bearing is to be removed with the tube being provided at one end with a screw device for forcing the axle from the tube and an integral flange and a pair of bearing grippers adapted to cooperate with the bearing and the flange to restrain the bearing so the axle may be forced through it. The invention also includes adaptors for removing a bearing inner race and modified grippers adapted to grip two different sized bearings.

---

This invention relates to devices for removing bearings from shafts. More particularly, the invention relates to a device for removing ball bearing assemblies from the rear axles of motor vehicles.

The term "bearings" as used herein means ball bearing assemblies which are mounted on automobile axles by a friction fit. While the bearing puller of the invention is adapted to remove other types of bearings from other types of shafts, it is primarily intended to remove ball bearings from automobile rear axles. The axles involved are generally known in the trade as "half-shafts," with the bearing being installed on the shaft towards its outer end to receive a wheel mounting and with the inner end of the shaft being connectible to the vehicle differential gear.

There have been many prior proposals for devices for removing bearings from shafts and the device of the present invention is characterized by simplicity and low cost which renders it particularly useful to the operators of small repair shops and service stations. This is contrasted with that type of bearing puller employed by large repair shops and manufacturing centers which are normally large hydraulic presses. The characteristic simplicity and low cost is gained through the provision of a pair of bearing grippers essentially consisting of short lengths of half tubing carrying integral axially spaced inwardly directed flanges for engaging, on the one hand, a flange carried by a tubular member in which the axle is received and the bearing to be removed on the other hand.

The bearing puller of the invention is also adapted to overcome a problem which is not met by the devices known heretofore, namely, the removal of bearings which are so badly worn that the outer race of the bearing breaks away from the inner race, leaving only the latter on the shaft. This is accomplished, in accordance with the invention, through the provision of a pair of raceway engaging elements and an outer race shaped member which are received in the grippers above mentioned and cooperate together and with the grippers to tightly grasp the inner race to be removed.

The invention further provides a modified form of bear-gripper having two differently sized internal diameters whereby it is adapted to remove both "regular" and "large" bearings.

The invention will be more thoroughly understood from the following description of preferred embodiments thereof as read in conjunction with the accompanying drawings.

In the drawings which illustrate these embodiments of the invention,

FIG. 1 is a perspective view being "exploded" at one end of a bearing puller in accordance with a first preferred embodiment of the invention;

FIG. 2 is a vertical and longitudinal cross-sectional view of the puller shown in FIG. 1 and taken along the line 2—2 of FIG. 1;

FIG. 3 is a perspective view of one end of a second embodiment of the puller in accord with the invention which is particularly adapted to remove an inner race from a shaft should the outer race have been broken away from the inner;

FIG. 4 is a vertical and longitudinal cross-sectional view of the puller of the type shown in FIG. 3 but assembled in operative form;

FIG. 5 is a perspective view of an alternative form of bearing grippers forming part of the puller of the invention;

FIG. 6 is a vertical and longitudinal cross-sectional view similar to FIG. 3 and showing the alternative grippers of FIG. 5 as they are used to remove normal sized bearings; and FIG. 7 is a view similar to FIG. 6 but showing the arrangement for removing oversized bearings.

Referring to FIG. 1, the bearing puller of the invention essentially consists of a tubular member 10 carrying at one end an integral flange 12 and at its other end a screw device 14 and a pair of mating bearing grippers 16.

As will be readily appreciated from FIG. 2, the tubular member 10 is adapted to receive a shaft 18 which carries a bearing 20 to be removed therefrom. As the puller of the invention was mainly intended to remove bearings from half-shafts of automobiles, the tubular member 10 is dimensioned to receive the majority of half-shafts now in common use. Tube 10 is preferably formed of relatively thick walled steel or cast iron pipe, with the flange 12 being formed integrally therewith. However, it will be appreciated that flange 12 might be a separate element fixed to a straight piece of pipe by welding or the like. As a preferred expedient, the tube is provided with an appenage 17 which can be used to hold the puller in a vice.

The left-hand end of the puller as shown in FIG. 1 is provided with an insert 22 having a central threaded bore adapted to receive a screw 14. As it is within the scope of the invention that the tubular member may be a cast item, it will also be appreciated that in lieu of a separate insert such as item 22, the left-hand end of the puller may be cast with an integral insert which is subsequently bored and threaded to receive the screw. It should also be noted that the inner end of the screw is preferably provided with a ball 24 or other friction reducing device so that the end of the shaft is not damaged due to the action of the screw as it bears thereagainst.

Bearing pullers essentially consisting of a tubular device adapted to receive a shaft have been known heretofore and the improvement which constitutes the present invention relates to the particular type of bearing grippers 16 shown in the drawings. The illustrated grippers are formed by forging or casting of steel and are dimensioned to grip the outer races of bearings in common use. They essentially consist of short lengths of half tubing carrying a pair of radially inward directed flanges 16a and 16b. As suggested above, the axial length of the grippers, i.e., the spacing between the flanges 16a and 16b, is selected to accommodate the majority of bearings now in common use.

As will be readily apparent from the drawings, the grippers 16 serve to hold the bearing 20 as the shaft is moved to the right as seen in FIG. 2 through the action of the screw 14. As "half-shafts" are commonly tapered, it is only necessary to move the shaft to the right a sufficient distance to pull the bearing from the straight portion of the shaft on which the bearing is installed. Thereafter the bearing moves freely due to the taper in the shaft.

The feature which renders the puller of this invention particularly attractive to small shop operators is the simplicity of the grippers 16. Prior bearing pullers of the type with which the present invention is concerned have employed relatively complicated devices for gripping the bearings and, apart from the prohibitive original purchase price of the prior pullers, their multi-piece construction has created problems in the smaller shops due to misplacement of various components. In the normal course, a small repair shop will use a bearing puller only at infrequent intervals and the simple four-piece puller of the present invention not only can be manufactured at relatively low cost but is a practical device for the small shop operator. In this regard, it should be noted that the puller of this invention is also useful for installing bearings on shafts. The tamping of the bearing into final position can be done by standing the shaft on its end, sliding the puller down the shaft until the flange 12 contacts the bearing and then raising and lowering the puller as to tamp the bearing into position.

A common problem in removing any ball bearing from a shaft is the possibility that the outer race may break away from the inner race due to excessive amount of wear of the balls. As most bearing pullers must of necessity be so dimensioned that the gripping of the bearing is effected by gripping the outer race, the devices known heretofore have not been adapted to remove a bearing once the outer race has been broken away. This problem is overcome by the present invention through the second embodiment thereof shown in FIGS. 3 and 4. FIG. 3 shows a shaft carrying the inner race 20a of a bearing from which the outer race has been torn away by a prior attempt to remove the bearing in its entirety. To provide a fresh grip on the inner race, the present invention provides a pair of semi-circular raceway engaging elements 30 which actually constitute artificial balls. As can be seen in FIG. 4, these elements 30 are rounded on their radially inner faces as to conform to the shape of the raceway formed in the outer surface of the inner race. Their radially outer faces are divergent outwardly towards the puller or, in other words, in the direction in which the bearing is to be moved relative to the shaft. A third outer race shaped member 32 which actually constitutes an artificial outer race is provided with a mating divergent face on its inside and is dimensioned and shaped to be gripped by the grippers 16 in the manner in which a normal outer race would be gripped. Thus, it can be seen that when pressure is applied to the shaft as to move it to the right as shown in FIG. 3, the force exerted by the member 32 on the element 30 will be one that will urge the elements radially inward as to tightly grip the inner race. Thus, the inner race can be removed from the shaft just as if the original outer race had not broken away.

As all half shafts are not the same length, there also is provided a number of spacers (not shown) which may be inserted between the screw 14 and the ends of the shafts. These are short pieces of rod material roughly equal in diameter to the inside dimension of tube 10 and having various lengths. By using the spacers in various combinations, it is possible to accommodate any half shaft.

The embodiment of the invention illustrated in FIGS. 1 and 2 is capable of removing the great majority of bearings that are in common use today. In fact, most automobile manufacturers use the same size bearings which are known in the trade as "regular" bearings. However, there are one or two uses of bearings somewhat larger than the regular bearings and while these could be removed by using grippers of the type shown in FIGS. 1 and 2 but of a larger size, the grippers shown in FIGS. 5 to 7 are adapted to remove both the regular and oversize bearings. Referring to FIG. 5, these multi-purpose grippers 40 have two different internal diameters, one of which will correspond to the internal diameter of the gripper shown in FIGS. 1 and 2 while the other will be larger than this as to accommodate oversize bearings. As a preferred expedient, the outside surface of the grippers 40 is also formed with two different diameters but this is done simply as a means of guiding the operator in placing the grippers together so that the internal diameters are matched up. In other words, the step 40a formed in the outside surface of the grippers 40 gives the user a visual indication that the grippers are being placed together properly.

To use grippers 40 to remove regular bearings, there is provided a sliding collar 42 which is moved up against the flange 12 of the tube to provide a larger seat for the enlarged portion of the grippers. This sliding collar 40 is carried loosely on the outside of the tube and is installed on the tube before the appendage 17 is welded in place so that the appendage serves to keep the collar on the tube.

When using grippers 40 to remove oversize bearings, as shown in FIG. 7, collar 42 is moved away from flange 12 and the grippers engage the latter flange in the normal manner.

It will be appreciated that the grippers 40 are functionally identical with the grippers 16 but have the added advantage of providing one pair of grippers for removing both oversize and regular bearings, whereas with the grippers of the type shown in FIGS. 1 and 2 it is necessary to provide two sizes of grippers. It will also be appreciated that the arrangement shown in FIGS. 3 and 4 for removing inner races may also be employed with the modified form of grippers shown in FIGS. 5 to 7. To this end there is also provided a pair of raceway engaging elements 30 which are sized to match the larger balls of the oversize bearings.

What is claimed is:

1. A bearing puller adapted to remove both regular and oversized ball bearing assemblies from automobile rear axle half shafts comprising a tubular member adapted to receive the shaft and carrying at one end a flange and at its other end a screw for exerting pressure against the inner end of the received shaft as to move the shaft outwardly of the tubular member, and a pair of mating bearing grippers, each of which consists of a short length of half tubing having an inwardly directed flange at one end for engaging said tubular member flange and a second inwardly directed flange at its other end for engaging the outer race of the ball bearing assembly to be removed from the shaft, said bearing grippers each being provided with two internal diameters, one of which is sized to accommodate regular bearings and the other of which is sized to accommodate oversized bearings, said inwardly directed flanges being so dimensioned that their radially inward peripheral faces have different circumferences, the flanges whose radially inward faces have the smaller circumference being carried at the ends of the grippers which have the smaller of the two internal diameters, and vice versa; and means for adapting either of the flanged ends of the grippers to fit on the flanged end of the tubular member, said last mentioned means consisting of a collar carried on the outside of said tubular member and movable into a position between said tubular member flange and the bearing gripper flanges whose radially inward faces have the larger circumference when pulling regular bearings so as to provide mechanical cooperation, through said collar, between the last mentioned bearing gripper flanges and said tubular member flange, said collar being movable away from said tubular member flange during the pulling of oversized bearings to permit direct mechanical cooperation between said tubular member flange and the bearing gripper flanges whose radially inward faces have the smaller circumference.

References Cited

UNITED STATES PATENTS

| | | | |
|---|---|---|---|
| 3,358,352 | 12/1967 | Wilcox | 29—263 |
| 1,970,682 | 8/1934 | Yordi | 29—263 |
| 1,629,003 | 5/1927 | Schonfeld | 29—259 X |
| 1,704,893 | 3/1929 | Harrison | 29—258 |
| 1,857,211 | 5/1932 | Odlum et al. | 29—257 |
| 3,174,218 | 3/1965 | McConaha | 29—256 |
| 3,299,497 | 1/1967 | Chmielewski | 29—258 |

FOREIGN PATENTS 613,985   12/1948   Great Britain.

MYRON C. KRUSE, *Primary Examiner.*